United States Patent
Hsu et al.

(10) Patent No.: US 7,930,472 B2
(45) Date of Patent: Apr. 19, 2011

(54) METHOD FOR ACCESSING A FIRST-IN-FIRST-OUT (FIFO) BUFFER AND A FIFO CONTROLLER THEREFOR

(75) Inventors: Mu-Hsien Hsu, Sinshih Township, Tainan County (TW); Tzung-Ren Wang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 629 days.

(21) Appl. No.: 12/071,828

(22) Filed: Feb. 27, 2008

(65) Prior Publication Data
US 2009/0216940 A1    Aug. 27, 2009

(51) Int. Cl.
*G06F 12/00* (2006.01)
(52) U.S. Cl. .............. 711/109; 711/154; 711/E12.001
(58) Field of Classification Search .................. 711/109, 711/E12.001, 154
See application file for complete search history.

(56) References Cited

U.S. PATENT DOCUMENTS
2008/0307177 A1* 12/2008 Daimon et al. ............... 711/162
* cited by examiner

*Primary Examiner* — Yong Choe
(74) *Attorney, Agent, or Firm* — Rabin & Berdo, P.C.

(57) ABSTRACT

A method of for accessing a first-in-first-out (FIFO) buffer is provided. The method comprises the following two steps. Firstly, issue a request to access a memory when the amount of the data buffered in the FIFO buffer is more than a threshold. Second, pop the data buffered in the FIFO buffer out to access the memory when the request is granted. If the FIFO buffer is a single-port FIFO buffer, the threshold is set based on the burst length of one burst of data. If the FIFO buffer is a dual-port FIFO buffer, the threshold is set based on the speed at which the data is pushed into the FIFO buffer and the speed at which the data is popped out of the FIFO buffer.

20 Claims, 5 Drawing Sheets

METHOD FOR ACCESSING A FIRST-IN-FIRST-OUT (FIFO) BUFFER AND A FIFO CONTROLLER THEREFOR

BACKGROUND OF THE INVENTION

1. Field of the Invention

The invention relates in general to a method and a controller for accessing a first-in-first-out (FIFO) buffer, and more particularly to a method and a controller for accessing a FIFO buffer to reduce the transmission time required for data to be transmitted from one clock domain to another clock domain.

2. Description of the Related Art

In a system having different clock domains, a first-in-first-out (FIFO) buffer is often used to buffer the data while it is being transmitted from one clock domain to another, so as to perform the synchronization between the different clock domains. In a conventional FIFO buffer access scheme, only a full flag and an empty flag are used to indicate whether the FIFO buffer is full or empty. The data in the FIFO buffer is popped out only when the FIFO buffer is full. Thus, the time delay between the moment that the data is transmitted from one clock domain and the moment that the data is received in the other clock domain is very long. Therefore, the data transmission of the system is inefficient.

To reduce the transmission time for transmitting data from one clock domain to another, two extra flags, a half-full flag and a half-empty flag, are used in another conventional FIFO buffer data scheme. However, the control logic required for using the two extra flags is significantly more complex. Therefore, a method for accessing the FIFO buffer which is not only efficient but also has a low hardware complexity is highly desirable.

SUMMARY OF THE INVENTION

The invention is directed to a method for accessing a FIFO buffer. By applying the method, the transmission time for transmitting each burst of data from one clock domain to another can be shorten, no matter the FIFO buffer is a single-port buffer or a dual-port buffer, and no matter the burst length of burst of data is fixed or unfixed. And hence, the system applying the method is efficient.

According to a first aspect of the present invention, a method of for accessing a first-in-first-out (FIFO) buffer is provided. The method comprises the following steps. Firstly, issue a request to access a memory when the amount of the data buffered in the FIFO buffer is more than a threshold. Next, pop the data buffered in the FIFO buffer out to access the memory when the request is granted. If the FIFO buffer is a single-port FIFO buffer, the threshold is set based on the burst length of one burst of data. If the FIFO buffer is a dual-port FIFO buffer, the threshold is set based on the speed that the data is pushed into the FIFO buffer and the speed that the data is popped out of the FIFO buffer.

According to a second aspect of the present invention, a FIFO controller for accessing a FIFO buffer is provided. The controller comprises means for issuing a request to access a memory when the amount of the data buffered in the FIFO buffer is more than a threshold, and means for popping the data buffered in the FIFO buffer out to access the memory when the request is granted. If the FIFO buffer is a single-port FIFO buffer, the threshold is set based on the burst length of one burst of data. If the FIFO buffer is a dual-port FIFO buffer, the threshold is set based on the speed that the data is pushed into the FIFO buffer and the speed that the data is popped out of the FIFO buffer.

The invention will become apparent from the following detailed description of the preferred but non-limiting embodiments. The following description is made with reference to the accompanying drawings.

DETAILED DESCRIPTION OF THE INVENTION

The method for accessing a first-in-first-out (FIFO) buffer according to the embodiment of the invention includes two steps. First, a request to access memory is issued when the amount of the data buffered in the FIFO buffer is more than some threshold. Second, the data in the FIFO buffer is popped out to access the memory when the request is granted. If the FIFO buffer is a single-port FIFO buffer, the threshold is set based on the burst length of one burst of data. If the FIFO buffer is a dual-port FIFO buffer, the threshold is set based on the speed at which the data is pushed into the FIFO buffer and the speed at which the data is popped out of the FIFO buffer.

Figure 1:
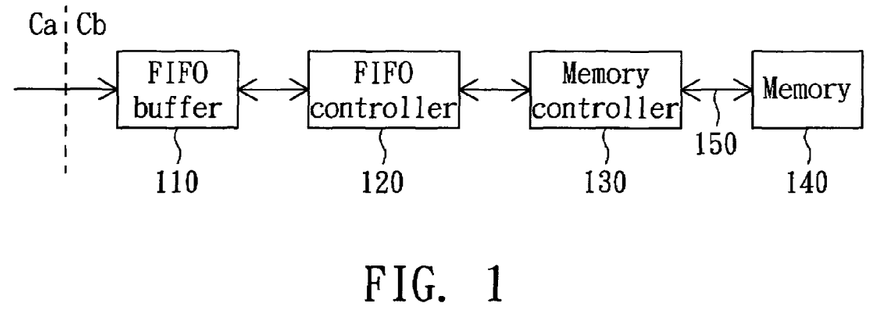
FIG. 1 shows a block diagram of the FIFO buffer, the FIFO controller, a memory controller and a memory.
Figure 2:
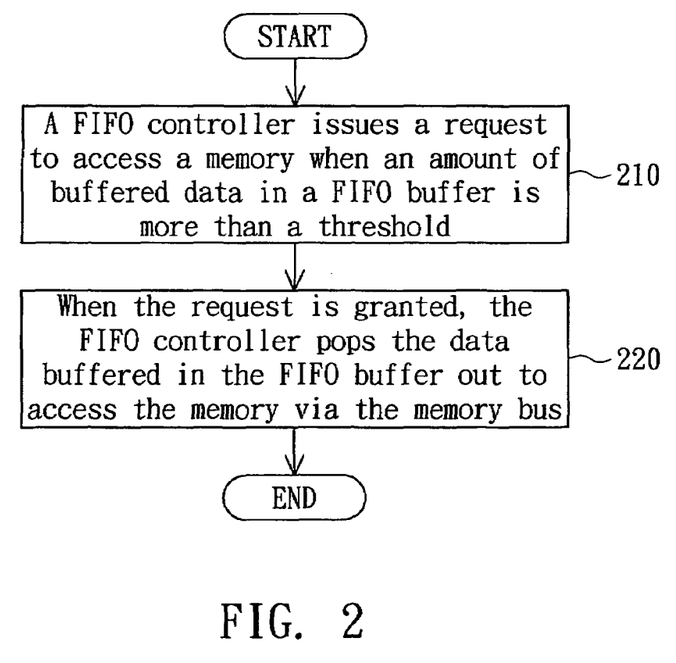
FIG. 2 shows a flow chart of the method for accessing the FIFO buffer 110 according to the embodiment of the invention.

FIG. 1 shows a block diagram of the FIFO buffer 110, the FIFO controller 120, a memory controller 130 and a memory 140 in a clock domain Cb. The FIFO buffer 110 is for buffering data transmitted from another clock domain Ca. According to the embodiment of the invention, the FIFO controller 120 is for accessing the FIFO buffer 110. The memory controller 130 is for accessing the memory 140 via a memory bus 150. FIG. 2 shows a flow chart of the method for accessing the FIFO buffer 110 according to the embodiment of the invention.

Referring to FIGS. 1 and 2, in step 210, the FIFO controller 120 issues a request to access the memory 140 when the amount of buffered data is more than the threshold.

In this embodiment, the FIFO controller 120 issues a request to the memory controller 130. After receiving the request, the memory controller 130 checks whether or not the memory bus 150 is free. When the memory bus 150 is free, the memory controller 130 grants the request.

Then in step 220, when the request is granted, the FIFO controller 120 pops the data buffered in the FIFO buffer 110 out to access the memory 140 via the memory bus 150.

In this embodiment, the threshold is set differently to adapt different types of FIFO buffer, so that at least one burst of data can be completely transmitted from the clock domain Ca to the clock domain Cb when a request is granted. The threshold for different types of FIFO buffer is discussed in the following.

If the FIFO buffer 110 is a single-port buffer, the threshold is set based on the length of one burst of data. In this embodiment, the threshold is set to the burst length of one burst of data. When the amount of data buffered in the FIFO buffer 110 is more than one burst length, that is, when a burst of data has been completely buffered in the FIFO buffer 110, the FIFO controller 120 issues a request to pop the burst of data out of the FIFO buffer 110.

Figure 3A:
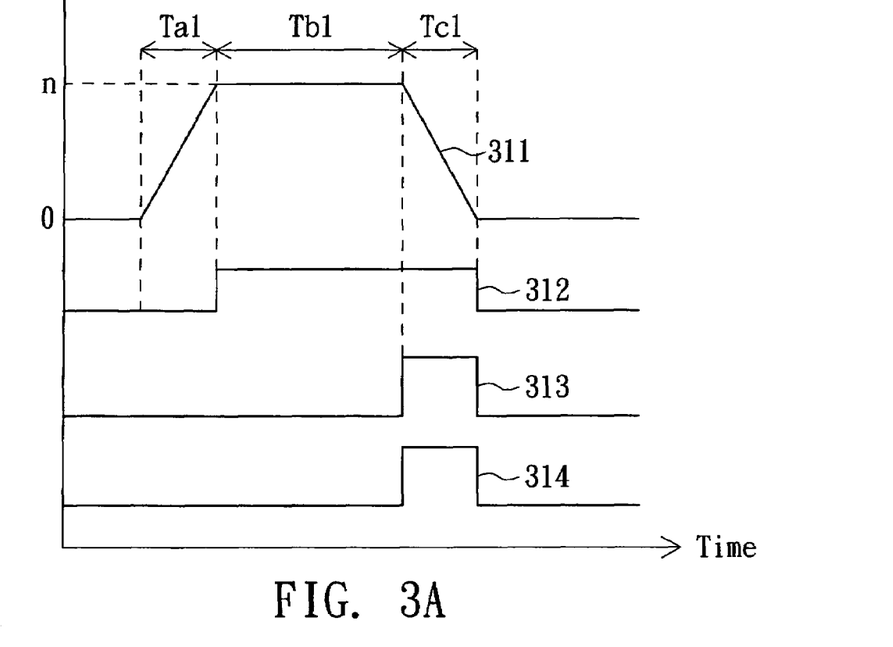
FIG. 3A shows an example of the timing diagram of the data buffering status of the FIFO buffer when a conventional FIFO access scheme is utilized to access the single-port FIFO buffer.
Figure 3B:
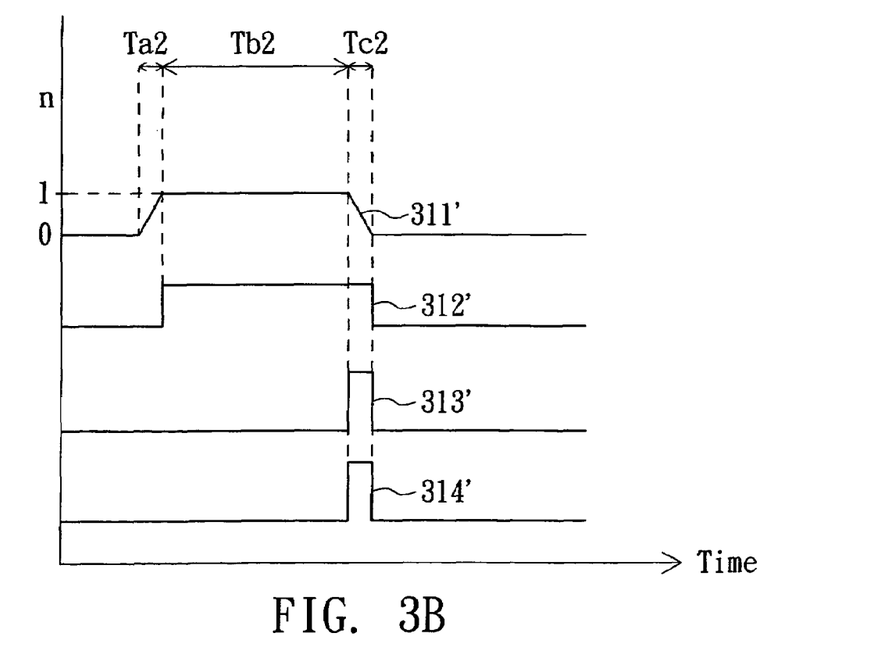
FIG. 3B shows the timing diagram of the data buffering status of the FIFO buffer when the method according to the embodiment is used to access the single-port FIFO buffer.
Figure 3C:
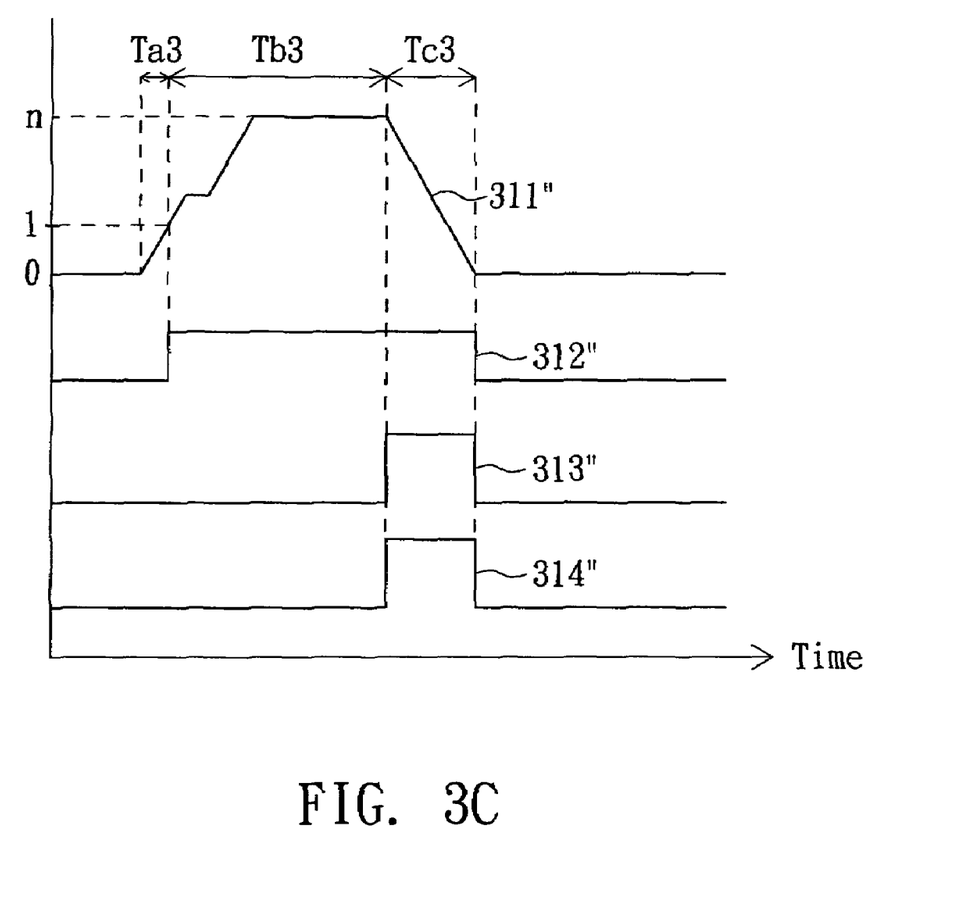
FIG. 3C shows another example of the timing diagram of the data buffering status of the FIFO buffer when the method according to the embodiment is used to access the single-port FIFO buffer.

Take FIGS. 3A, 3B and 3C as example to compare the method according to the embodiment with the conventional FIFO buffer access scheme when the FIFO buffer 110 is a single-port buffer. FIG. 3A shows an example of the timing diagram of the data buffering status of the FIFO buffer 110 when the conventional FIFO access scheme, which issues the request when the FIFO buffer 110 is full, is utilized to access the single-port FIFO buffer.

Referring to FIG. 3A, the signal 311 indicates the amount of data buffered in the FIFO buffer 110, the signal 312 indicates whether the request is issued, the signal 313 indicates whether the request is granted, and the signal 314 indicates whether the memory 140 is accessed. The size of the FIFO buffer 110 is n bytes/bits/words/etc.

Referring to signal 311, the data is pushed into the FIFO buffer 110 until the FIFO buffer is full, i.e., the amount of data buffered in the FIFO buffer 110 is n. The period during which the FIFO buffer 110 receives the data is Ta1. When the FIFO buffer 110 becomes full, the signal 312 goes high, indicating that a request is being issued. After the request is issued, there is a waiting period Tb1 before the request is granted. After the period Tb1 is over, there is a period Tc1 during which the signal 313 is high indicating that the request is being granted. Then the signal 314 is also turned high, which indicates that the memory 140 is being accessed, i.e., that the data buffered in the FIFO buffer 110 is being popped out to the memory 140. Thus, the amount of buffered data is reduced until the FIFO buffer 110 is empty, at which time the signal 311 returns to 0. When the FIFO buffer 110 becomes empty, the request is finished, and the memory bus 150 is released.

FIG. 3B shows an example of the timing diagram of the data buffering status of the FIFO buffer 110 when the method according to the embodiment is used to access the single-port FIFO buffer 110. The signals 311' to 314' have the same meanings as the signals 311 to 314, respectively.

Referring to the signal 312', the request is issued when the first burst of data is buffered in the FIFO buffer 110, which is earlier than the moment at which the request is issued in FIG. 3A. After the period Tb2, the request is granted. Thus during the period Tc2, the first burst of data is popped out of the FIFO buffer 110.

Referring back to FIG. 3A, when the conventional access scheme is applied, the request is not issued until the FIFO buffer 110 is full. When a first bust of data is pushed into the FIFO buffer 110, the request has not been issued. The first burst of data has to be buffered in the FIFO buffer 110 until the request is issued and is granted.

In contrast, in FIG. 3B when the method according to the embodiment is applied, the request is issued as soon as the first burst of data is pushed in. Therefore, the request is granted earlier and the first burst of data is popped out earlier. In FIG. 3B, it is assumed the period Tb2, during which the request waits to be granted, is as long as the period Tb1. Referring to FIGS. 3A and 3B, when the method according to the embodiment is applied to access the FIFO buffer 110, the first burst of data can be popped out of the FIFO buffer 110 earlier.

FIG. 3C shows another example of the timing diagram of the data buffering status of the FIFO buffer 110 when the method according to the embodiment is used to access the single-port FIFO buffer 110. The signals 311" to 314" have the same meanings as the signals 311 to 314, respectively.

Referring to the signal 312", the request is issued when the first burst of data is buffered in the FIFO buffer 110, which is earlier than the moment at which the request is issued in FIG. 3A. During the period Tb3, a second burst of data is pushed into the FIFO buffer 110, filling up the buffer 110. Meanwhile the request has been waiting to be granted. Then during the period Tc3, the request is granted, the buffered data, including the first and the second bursts of data, is popped out to the memory 140.

Since in FIG. 3C the request is issued when the first burst of data is buffered, which is before the FIFO buffer 110 is full, the request is granted earlier. In FIG. 3C, it is assumed the period Tb3, during which the request waits to be granted, is as long as the period Tb1. Therefore, in FIG. 3C, when the method according to the embodiment is applied to access the FIFO buffer 110, the data buffered in the FIFO buffer 110 can be popped out earlier, compared that in FIG. 3A.

Besides, with the threshold equal to one burst of data, at least one burst of data can be completely transmitted from the clock domain Ca to the clock domain Cb during the time that the request is being granted. Thus, the buffer would not be empty when the request is being granted, which prevent the error in which the empty FIFO buffer is accessed.

Referring to FIGS. 3A and 3C, the sum of the periods Ta3, Tb3, and Tc3 is less than that of the periods Ta1, Tb1, and Tc1. Since the FIFO buffer 110 is full in both FIGS. 3A and 3C, the total amounts of data transmitted from the clock domain Ca to the clock domain Cb in FIGS. 3A and 3C are both equal to n. Therefore, in FIG. 3C, the transmission time for the same amount of data is shorter when the method according to the embodiment is applied. Therefore, the method according to the embodiment for accessing the FIFO buffer 110 is more efficient than the conventional FIFO buffer access scheme when the FIFO buffer 110 is a single-port buffer.

If the FIFO buffer 110 is a dual-port buffer, for which data can be both pushed into and popped out of at the same time, the threshold is set based on the speeds at which the data is pushed into and popped out of the FIFO buffer. That is, the threshold is set based on the frequency of the clock domain Ca and the frequency of the clock domain Cb.

If the data is pushed into the FIFO buffer 110 faster than the buffered data is, popped out the threshold is equal to zero. That is, the request is issued as soon as there is some data pushed into the FIFO buffer 110, no matter whether the burst length of one burst of data is fixed or not.

Since the data is pushed into the FIFO buffer 110 faster than the buffered data is popped out, there is always data waiting to be popped out when the request is granted. Therefore, with the threshold set to zero, at least one burst of data can be completely transmitted from the clock domain Ca to the clock domain Cb while the request is granted.

Because the request is issued as soon as there is data pushed into the FIFO buffer 110, which happens before the FIFO buffer 110 is full, the request is granted early and the memory can therefore be accessed early. Hence, the transmission time for the same amount of data when the method according to the embodiment is applied is shorter than the method when the conventional FIFO buffer access scheme is applied.

When the buffered data is popped out of the FIFO buffer 110 faster than the data is pushed, then the threshold is set based on the ratio of the speed at which the buffered data is popped out to the speed at which the data is pushed into the FIFO buffer 110. In the embodiment, the threshold is set differently under the situation where the burst length of one burst of data is fixed and under the situation where one burst of data is not fixed.

If the burst length of the burst of data is fixed, then the threshold is set based on the length of the FIFO buffer 110 and the ratio defined in [0023]. In this embodiment, the speed at which the buffered data is popped out of the FIFO buffer 110 is equal to Sr and the speed at which the data is pushed into the FIFO buffer 110 is equal to St. The ratio N is equal to Sr/St. The length of the FIFO buffer 110 is Lm. In this embodiment, the threshold is set to $$\left\lceil \frac{(N-1)}{N} \times Lm \right\rceil.$$

Figure 4A:
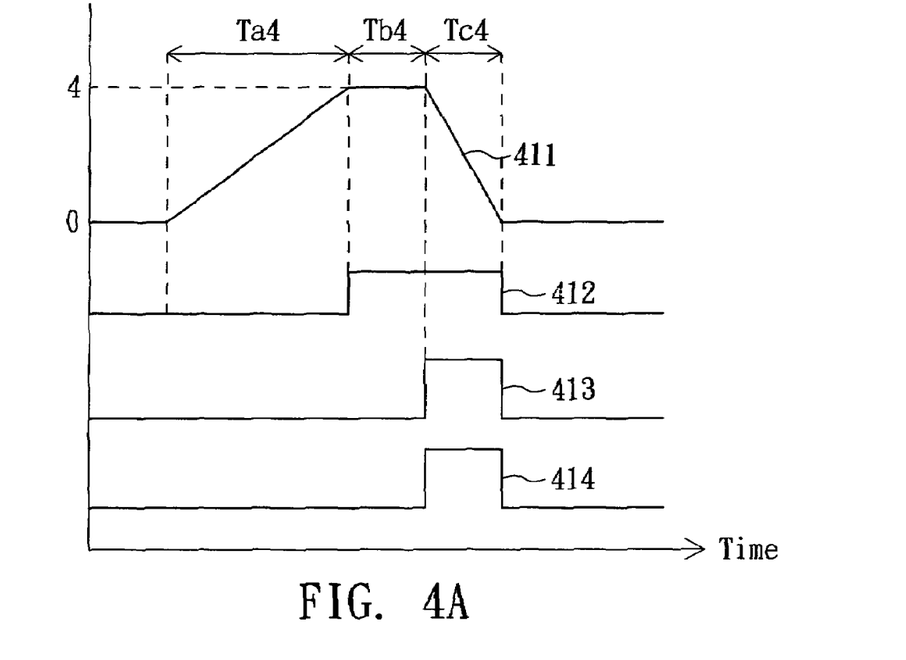
FIG. 4A shows an example of the timing diagram of the data buffering status of the FIFO buffer when the conventional FIFO access scheme is applied to access the dual-port FIFO buffer.
Figure 4B:
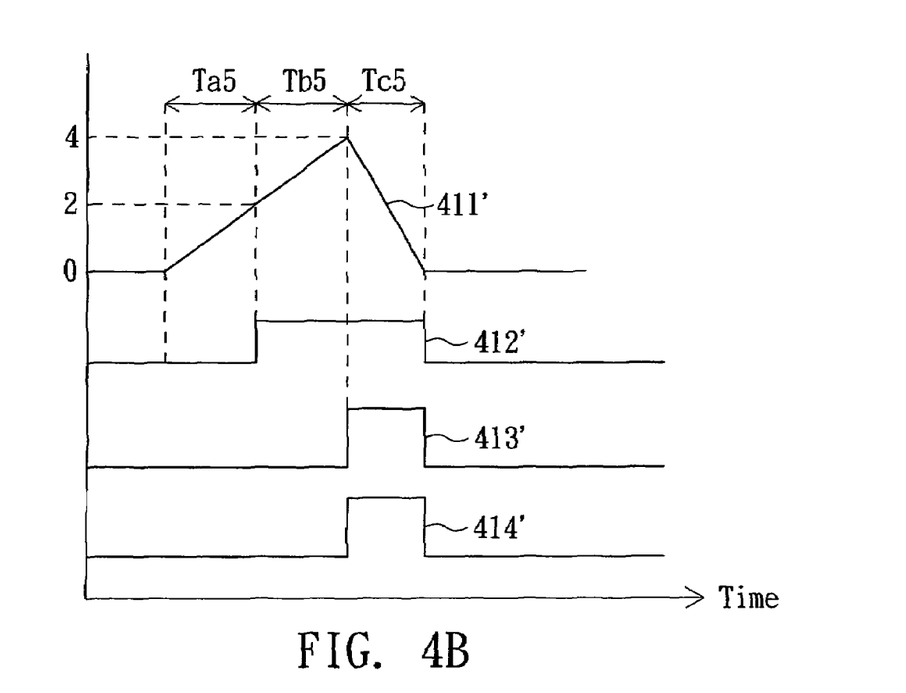
FIG. 4B shows the timing diagram of the data buffering status of the FIFO buffer when the method according to the embodiment is used to access the single-port FIFO buffer.

Take FIGS. 4A and 4B as an example to compare the method according to the embodiment with the conventional FIFO buffer access scheme when the FIFO buffer 110 is a dual-port buffer, the buffered data is popped out of the FIFO buffer faster, and the burst length is fixed. In this case, it is assumed that the length of the FIFO buffer 110 is 4 bytes, the speed Sr that the buffer data is popped out of the FIFO buffer 110 is 2 bytes per unit of time, the speed St that the data is pushed into the FIFO buffer 110 is 1 byte per unit time. Hence the ratio N is 2.

FIG. 4A shows an example of the timing diagram of the data buffering status of the FIFO buffer 110 when the conventional FIFO access scheme, which issues the request when the FIFO buffer 110 is full, is applied to access the dual-port FIFO buffer. The signals 411 to 414 have the same meanings as the signals 311 to 314, respectively. The periods Ta4, Tb4, and Tc4 are similar to the periods Ta1, Tb1, and Tc1 in FIG. 3A, respectively. In the signal 411, the speed at which the amount of data in the FIFO buffer 110 is reduced during the period Tc4 is 2 times faster than the speed at which the amount of data therein increases during the period Ta4, indicating that the buffered data is popped out 2 times faster than the data is pushed in.

FIG. 4B shows the timing diagram of the data buffering status of the FIFO buffer 110 when the method according to the embodiment is used to access the dual-port FIFO buffer 110. The signals 411' to 414' have the same meaning as the signals 411 to 414, respectively.

In FIG. 4B, the threshold is set to 2, which is $$\left\lceil \frac{(2-1)}{2} \times 4 \right\rceil.$$

During the period Ta5, the data keeps being pushed into the FIFO buffer 110. When the amount of buffered data is more than the threshold, equal to 2 bytes, the request is issued. The request waits for to be granted during the period Tb5. Meanwhile, data continues to be pushed into the FIFO buffer 110. After the period Tb5, the request is granted. During the period Tc5, the data buffered in the FIFO buffer 110 is popped out. The amount of buffered data in the FIFO buffer 110 decreases.

Since the request is issued before the FIFO buffer 110 is full, the request is granted early and the memory is accessed early. Referring to FIGS. 4A and 4B, the amount of data pushed into and popped out of the FIFO buffer 110 are the same, i.e. four bursts of data. It is assumed that the period Tb5, during which the request waits to be granted, is as long as the period Tb4. The transmission time that the four bursts of data transmitted from the clock domain Ca to the clock domain Cb in FIG. 4B is therefore shorter than that in FIG. 4A. Thus, the method according to the embodiment for accessing the FIFO buffer 110 is more efficient than the conventional FIFO buffer access scheme when the FIFO buffer 110 is a dual-port buffer and the burst length of data is fixed.

In addition, when the buffered data is popped out of the FIFO buffer 110 faster than data is pushed into the FIFO buffer 110, and the request is issued and granted too early. Then before one burst of data is completely pushed into the FIFO buffer 110, all of the data in FIFO buffer 110 may be popped out, with the result that the FIFO buffer 110 becomes empty. Consequently, one burst of data has not yet been completely popped out while the request is being granted. Another request is needed to access the remainder of the burst of data, which causes inefficient use of the memory bus.

Therefore, in the embodiment, the FIFO controller 120 pops the buffered data out only after the amount of the buffered data is more than the threshold $$\left\lceil \frac{(N-1)}{N} \times Lm \right\rceil.$$

As a result, there is always data buffered in the FIFO buffer 110 while the request is being granted. In this way, at least one burst of data can be completely transmitted from the clock domain Ca to the clock domain Cb.

If the FIFO buffer 110 is a dual-port buffer, the buffered data is popped out of the FIFO buffer 110 faster than data is pushed in, and if the burst length of one burst of data is not fixed, then the threshold is set based on the most frequently occurring burst length the ratio N, and the most frequently occurring period from the moment that the request is issued to the moment that the request is granted.

Figure 5A:
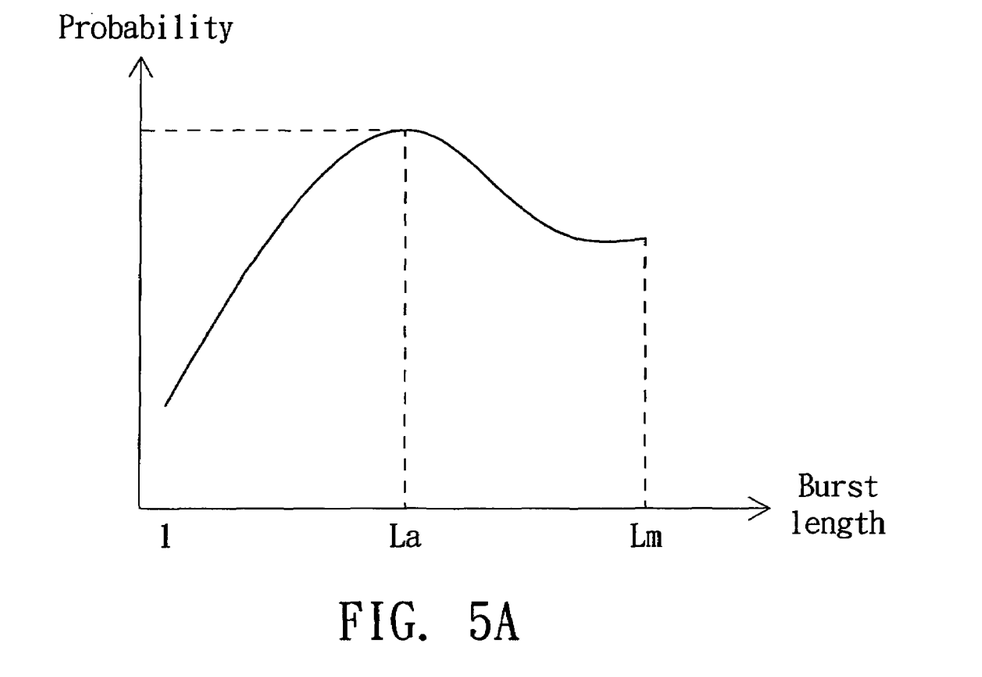
FIG. 5A shows the probability distribution diagram of the burst length of one burst of data.

FIG. 5A shows the probability distribution diagram of the burst length of one burst of data. The x-axis represents the burst length, and the y-axis represents the probability that a burst length occurs. Referring to FIG. 5A, the burst length La is the one that occurs most frequently.

Figure 5B:
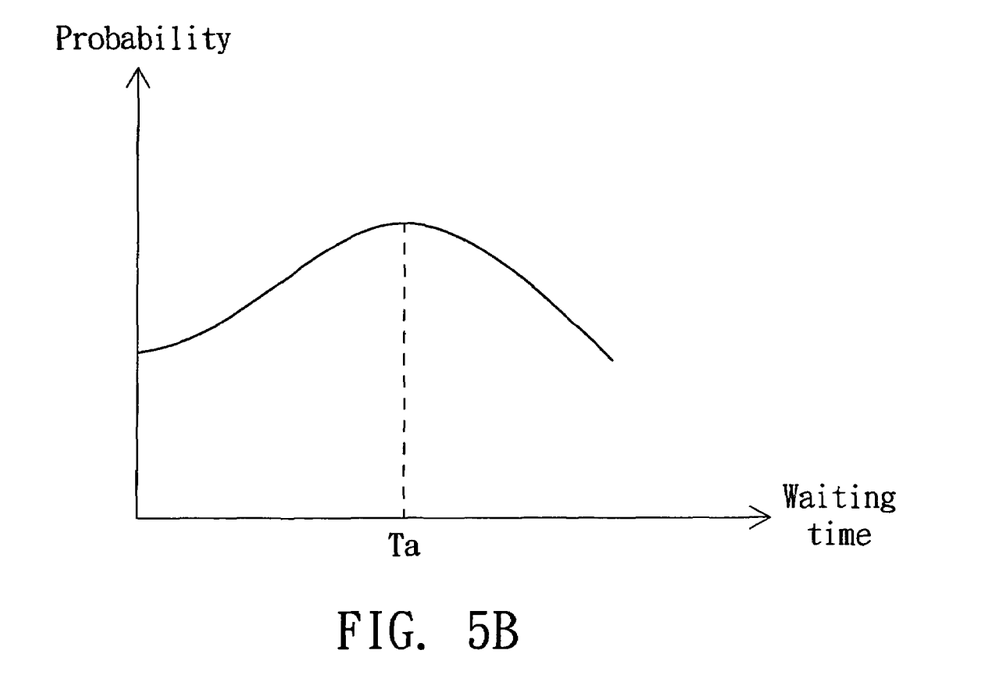
FIG. 5B shows the probability distribution diagram of the waiting time from the moment the request is issued to the moment the request is granted.

FIG. 5B shows the probability distribution diagram of the waiting time from the moment the request is issued to the moment the request is granted. The x-axis represents the waiting time, and the y-axis represents the probability of occurrence of the waiting time. Referring to FIG. 5A, the waiting time Ta is the one occurs most frequently.

In the embodiment, the threshold is set according to a reference value, which is set based on the burst length La, the ratio N, and the waiting time Ta. Further, the reference value is $$\left\lceil \frac{(N-1)}{N} \times La - (Ta \times St) \right\rceil,$$

where St is the speed at which the data is pushed into the FIFO buffer 110.

When each burst of data is pushed into the FIFO buffer 110, a threshold is set for each burst of data. In this embodiment, when a burst length of a burst B1 of data is smaller than the reference value, meaning that the burst B1 of data is sufficiently short, then the threshold for the burst B1 is set equal to its burst length. Take a reference value of 4 bytes as an example. When the burst B1 of data is completely pushed into the FIFO buffer 110, and its burst length is smaller than 4 bytes, the request is issued. Since it is unknown that when the next burst of data will be pushed into the FIFO buffer 110, it may take a long waiting time for the amount of buffered data to increase to more than 4 bytes. Hence, the request is issued as soon as the burst B1 of data is completely pushed into the FIFO buffer 110, so as to prevent delaying the transmission for the burst B1.

In this embodiment, when a burst length of a burst B2 of data is not smaller than the reference value, then the threshold for the burst B2 of data is set as the reference value. Take a reference value of 4 bytes as an example. When the burst B2 of data is pushed into the FIFO buffer 110 and the buffered amount of the burst B2 of data reaches 4 bytes, that is, when the burst length of the burst B2 of data is not smaller than 4 bytes, then the request is issued. Therefore, when the burst length of a burst of data is sufficiently long, then the FIFO controller 120 issues the request before the burst of data is completely pushed into the FIFO buffer 110, so that the request can be granted earlier. Consequently, the transmission time for each burst of data when the method according to the embodiment is applied is shorter than that when the conventional FIFO buffer access scheme is applied.

Thus, if the burst length of each burst of data is not fixed, each burst of data corresponds to a threshold, which is decided according to the burst length of each burst of data.

Therefore, by applying the method for accessing the FIFO buffer according to the embodiment, the transmission time for transmitting each burst of data from one clock domain to another can be shortened, no matter whether the FIFO buffer is a single-port buffer or a dual-port buffer, and no matter whether the burst length of burst of data is fixed or not. And hence, the system applying the method according to the embodiment is efficient. Furthermore, since the method needs only the full flag and the empty flag for indicating whether the FIFO buffer is full or empty, the control logic of the system applying the method has a very low complexity.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for accessing a first-in-first-out (FIFO) buffer, comprising:
issuing a request to access a memory when an amount of data buffered in the FIFO buffer is more than a threshold; and
popping the data buffered in the FIFO buffer out to access the memory when the request is granted;
wherein if the FIFO buffer is a single-port FIFO buffer, the threshold is set based on a burst length of one burst of data;
wherein if the FIFO buffer is a dual-port FIFO buffer, the threshold is set based on a speed that the data is pushed into the FIFO buffer and a speed that the data is popped out of the FIFO buffer.

2. The method according to claim 1, wherein if the FIFO buffer is the single-port buffer, the threshold is equal to the burst length of the burst of data.

3. The method according to claim 1, wherein if the FIFO buffer is the dual-port buffer and the data is pushed into the FIFO buffer faster than the buffered data being popped out of the FIFO buffer, the threshold is equal to zero.

4. The method according to claim 1, wherein if the FIFO buffer is the dual-port buffer, the buffered data is popped out of the FIFO buffer faster than the data being pushed into the FIFO buffer, then the threshold is set based on a ratio of the speed that the buffered data is popped out of the FIFO buffer to the speed that the data is pushed into the FIFO buffer.

5. The method according to claim 4, wherein if the FIFO buffer is the dual-port buffer, the buffered data is popped out of the FIFO buffer faster than the data being pushed into the FIFO buffer, and the burst length of one burst of data is fixed, then the threshold is set based on a length of the FIFO buffer and the ratio.

6. The method according to claim 5, wherein if the FIFO buffer is the dual-port buffer, the buffered data is popped out of the FIFO buffer faster than the data being pushed into the FIFO buffer, and the burst length of the burst of data is fixed, then the threshold is equal to $$\left\lceil \frac{(N-1)}{N} \times Lm \right\rceil,$$

wherein Lm is equal to the length of the FIFO buffer, N is equal to the ratio.

7. The method according to claim 4, wherein if the FIFO buffer is the dual-port buffer, the buffered data is popped out of the FIFO buffer faster than the data being pushed into the FIFO buffer, and the burst length of one burst of data is unfixed, then the threshold is set based on the burst length, which occurs most frequently, of the burst of data, the ratio, and a waiting time, which occurs most frequently, from a moment that the request is issued to a moment that the request is granted.

8. The method according to claim 7, wherein when the burst length of the burst of data is small than a reference value, then the threshold is set to be equal to the burst length of the burst of data, wherein the reference value is set based on the burst length, which occurs most frequently, the ratio, and the waiting time, which occurs most frequently.

9. The method according to claim 8, wherein if the burst length of the burst of data is greater than the reference value, then the threshold is set to be equal to the reference value.

10. The method according to claim 7, wherein the reference value is set to be equal $$\left\lceil \frac{(N-1)}{N} \times La - (Ta \times St) \right\rceil,$$

to wherein N is equal to the ratio, La is equal to the burst length, which occurs most frequently, Ta is equal to the waiting time, which occurs most frequently, St is equal to the speed that the burst of data is pushed into the FIFO buffer.

11. A FIFO controller for accessing a FIFO buffer, the controller comprising:
means for issuing a request to access a memory when an amount of data buffered in the FIFO buffer is more than a threshold; and
means for popping the data buffered in the FIFO buffer out to access the memory when the request is granted;
wherein if the FIFO buffer is a single-port FIFO buffer, the threshold is set based on a burst length of one burst of data;
wherein if the FIFO buffer is a dual-port FIFO buffer, the threshold is set based on a speed that the data is pushed into the FIFO buffer and a speed that the data is popped out of the FIFO buffer.

12. The FIFO controller according to claim 11, wherein if the FIFO buffer is the single-port buffer, the threshold is equal to the burst length of the burst of data.

13. The FIFO controller according to claim 11, wherein if the FIFO buffer is the dual-port buffer and the data is pushed into the FIFO buffer faster than the buffered data being popped out of the FIFO buffer, the threshold is equal to zero.

14. The FIFO controller according to claim 11, wherein if the FIFO buffer is the dual-port buffer, the buffered data is popped out of the FIFO buffer faster than the data being pushed into the FIFO buffer, then the threshold is set based on a ratio of the speed that the buffered data is popped out of the FIFO buffer to the speed that the data is pushed into the FIFO buffer.

15. The FIFO controller according to claim 14, wherein if the FIFO buffer is the dual-port buffer, the buffered data is popped out of the FIFO buffer faster than the data being pushed into the FIFO buffer, and the burst length of the burst of data is fixed, then the threshold is set based on a length of the FIFO buffer and the ratio.

16. The FIFO controller according to claim 15, wherein if the FIFO buffer is the dual-port buffer, the buffered data is popped out of the FIFO buffer faster than the data being pushed into the FIFO buffer, and the burst length of the burst of data is fixed, then the threshold is equal to $$\left\lceil \frac{(N-1)}{N} \times Lm \right\rceil,$$

wherein Lm is equal to the length of the FIFO buffer, N is equal to the ratio.

17. The FIFO controller according to claim 14, wherein if the FIFO buffer is the dual-port buffer, the buffered data is popped out of the FIFO buffer faster than the data being pushed into the FIFO buffer, and the burst length of the burst of data is unfixed, then the threshold is set based on the burst length, which occurs most frequently, of the burst of data, the ratio, and a waiting time, which occurs most frequently, from a moment that the request is issued to a moment that the request is granted.

18. The FIFO controller according to claim 17, wherein if the burst length of the burst of data is small than a reference value, then the threshold is set to be equal to the burst length of the first burst of data, wherein the reference value is set based on the burst length, which occurs most frequently, the ratio, and the waiting time, which occurs most frequently.

19. The FIFO controller according to claim 18, wherein if the burst length of the burst of data is not smaller than the reference value, then the threshold is set to be equal to the reference value.

20. The FIFO controller according to claim 18, wherein the reference value is set to be equal to $$\left\lceil \frac{(N-1)}{N} \times La - (Ta \times St) \right\rceil,$$

wherein N is equal to the ratio, La is equal to the burst length, which occurs most frequently, Ta is equal to the waiting time, which occurs most frequently, St is equal to the speed that the burst of data is pushed into the FIFO buffer.

* * * * *